(12) United States Patent
Olevskiy et al.

(10) Patent No.: US 10,187,957 B2
(45) Date of Patent: Jan. 22, 2019

(54) MULTIWAY SWITCH

(71) Applicants: Arseniy E. Olevskiy, Moscow (RU); Aleksandr A. Chernishev, Tashkent (UZ)

(72) Inventors: Arseniy E. Olevskiy, Moscow (RU); Aleksandr A. Chernishev, Tashkent (UZ)

( * ) Notice: Subject to any disclaimer, the term of this patent is extended or adjusted under 35 U.S.C. 154(b) by 0 days.

(21) Appl. No.: 15/390,677

(22) Filed: Dec. 26, 2016

(65) Prior Publication Data
US 2018/0184502 A1 Jun. 28, 2018

(51) Int. Cl.
H05B 37/02 (2006.01)
H01H 47/00 (2006.01)

(52) U.S. Cl.
CPC ......... *H05B 37/0209* (2013.01); *H01H 47/00* (2013.01)

(58) Field of Classification Search
CPC ............ H05B 37/0209; H05B 37/0272; H05B 39/08; H05B 39/086; H05B 39/041; H05B 37/02; H05B 37/0227; H05B 33/0842; H05B 33/0845; H05B 33/0896; H05B 37/0245; H05B 37/0254; H05B 39/088; H05B 41/3924
See application file for complete search history.

(56) References Cited

U.S. PATENT DOCUMENTS

| | | | |
|---|---|---|---|
| 6,710,553 B2 | 3/2004 | Logan | |
| 6,841,941 B2 | 6/2005 | Kim et al. | |
| 7,002,264 B2 | 2/2006 | Logan | |
| 7,116,061 B2 | 10/2006 | Kim et al. | |
| 8,183,784 B2 | 5/2012 | Willaert et al. | |
| 2008/0129483 A1 | 6/2008 | Wen | |
| 2015/0130282 A1 | 5/2015 | Mishra et al. | |
| 2016/0007417 A1 | 1/2016 | Gao et al. | |
| 2016/0012989 A1* | 1/2016 | Wilson | H05B 37/02 200/42.01 |
| 2016/0143115 A1* | 5/2016 | Zhang | H05B 37/0209 315/294 |
| 2017/0086281 A1* | 3/2017 | Avrahamy | H05B 37/0272 |

* cited by examiner

*Primary Examiner* — Seokjin Kim
(74) *Attorney, Agent, or Firm* — Douglas L. Weller

(57) ABSTRACT

Multiway switching, detects when any of a plurality of switches connected in series transitions between a first switch position and a second switch position. Power supplied to an electrical load is toggled when any switch in the plurality of switches is detected transitioning between the first switch position and the second switch position. When the electrical load is electrically disconnected from the power source, the toggling results in the electrical load being electrically connected to the power source. When the electrical load is electrically connected to the power source, the toggling results in the electrical load being electrically disconnected from the power source.

17 Claims, 4 Drawing Sheets

MULTIWAY SWITCH

BACKGROUND

In building wiring, multiway switching is the interconnection of two or more electrical switches to control lighting or another electrical load. For example, multiway switching allows lighting to be controlled from many locations. This is useful, for example, in a stairwell, hallway or large room where it is desirable to allow control of lighting from more than one location. Often multiway switching is implemented by switches that have one or more additional contacts and two or more wires are run between switches. For example, when a load is controlled from two points, single pole, double throw (SPDT) switches can be used. Double pole, double throw (DPDT) switches allow control from three or more locations.

DESCRIPTION OF THE EMBODIMENT

Figure 1:
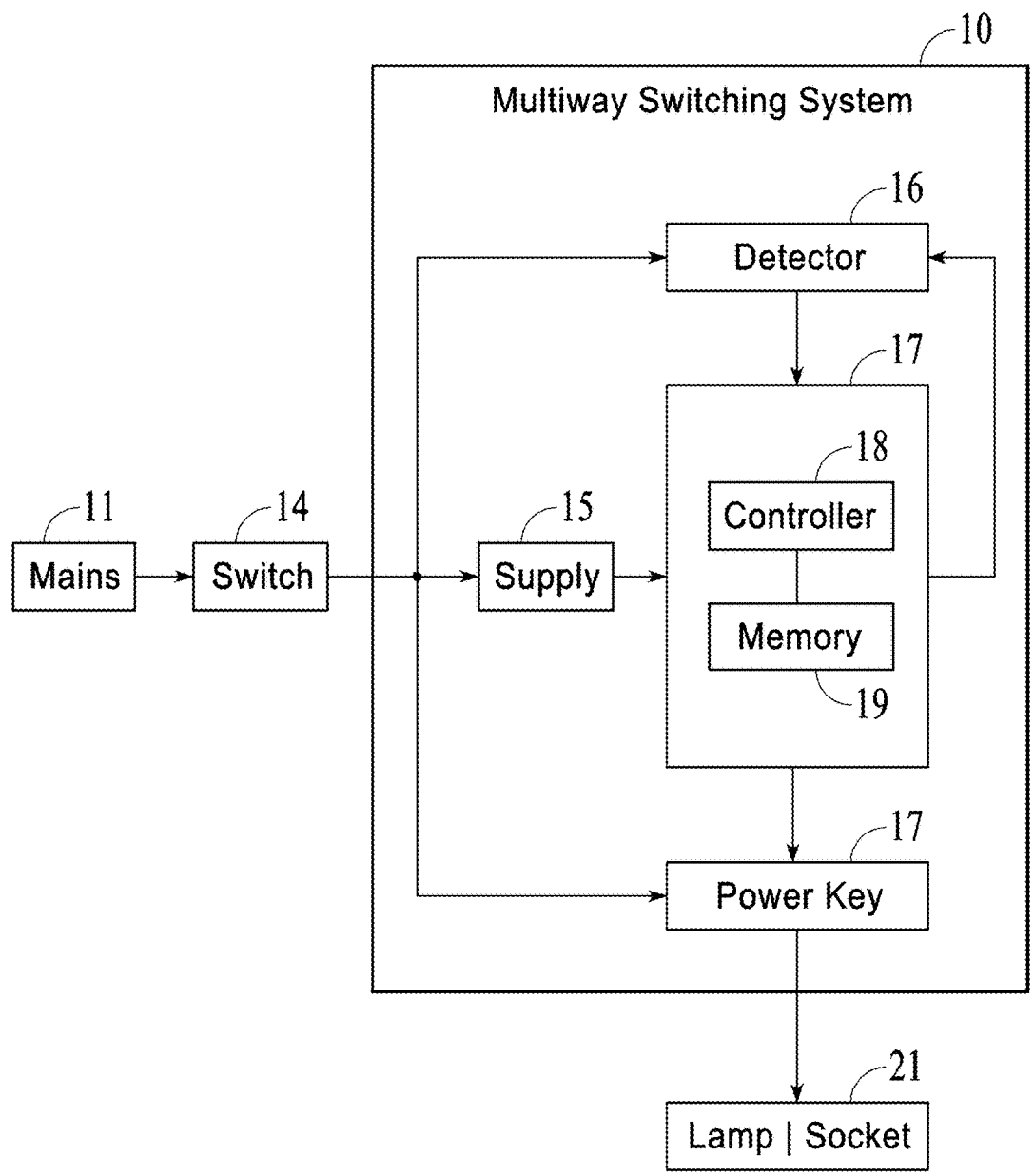
FIG. 1 is a simplified block diagram of a multiway switching system in accordance with an embodiment.

FIG. 1 is a simplified block diagram of a multiway switching system 10. Multiway switching system 10 operates by sensing any one of a series of switches being toggled. The operation of multiway switching 10 is first described using a single switch 14 that can be toggled between a first switch position and a second switch position. Whenever switch 14 toggles, multiway switching system 10 toggles the state of a lamp 21 from an OFF state to an ON state or from the ON state to the OFF state. While FIG. 1 shows a single lamp 21, single lamp 21 can be replaced by a lamp system with more than one lamp or by any electrical load such for a fan or any device to be turned ON and OFF. Also, multiway switching system 10 can be in separate housing from housing from lamp 21, or multiway switching system 10 can integrated into the same housing with lamp 21 to form a "smart" light.

Main power supply 11 supplies alternating current (AC) power to switch 14. In both the first switch position and the second switch position, power from main power supply 11 is connected through switch 14 to multiway switching system 10. However, for the brief time it takes switch 14 to toggle between the first switch position and the second switch position, power through switch 14 is disconnected. A detector 16 senses the brief time power is disconnected during the time switch 14 toggles between the first switch position and the second switch position and signals control circuitry 17 that a switch toggle has been detected. For example, control circuitry 17 includes a controller 18 and a memory 19. A power supply 15 provides direct current (DC) power to control circuitry 17.

When detector 16 signals control circuitry 17 that a switch toggle has been detected, control circuitry 17 signals power key 10 to toggle the state of lamp 21 from an OFF state to an ON state or from the ON state to the OFF state.

Figure 2A:
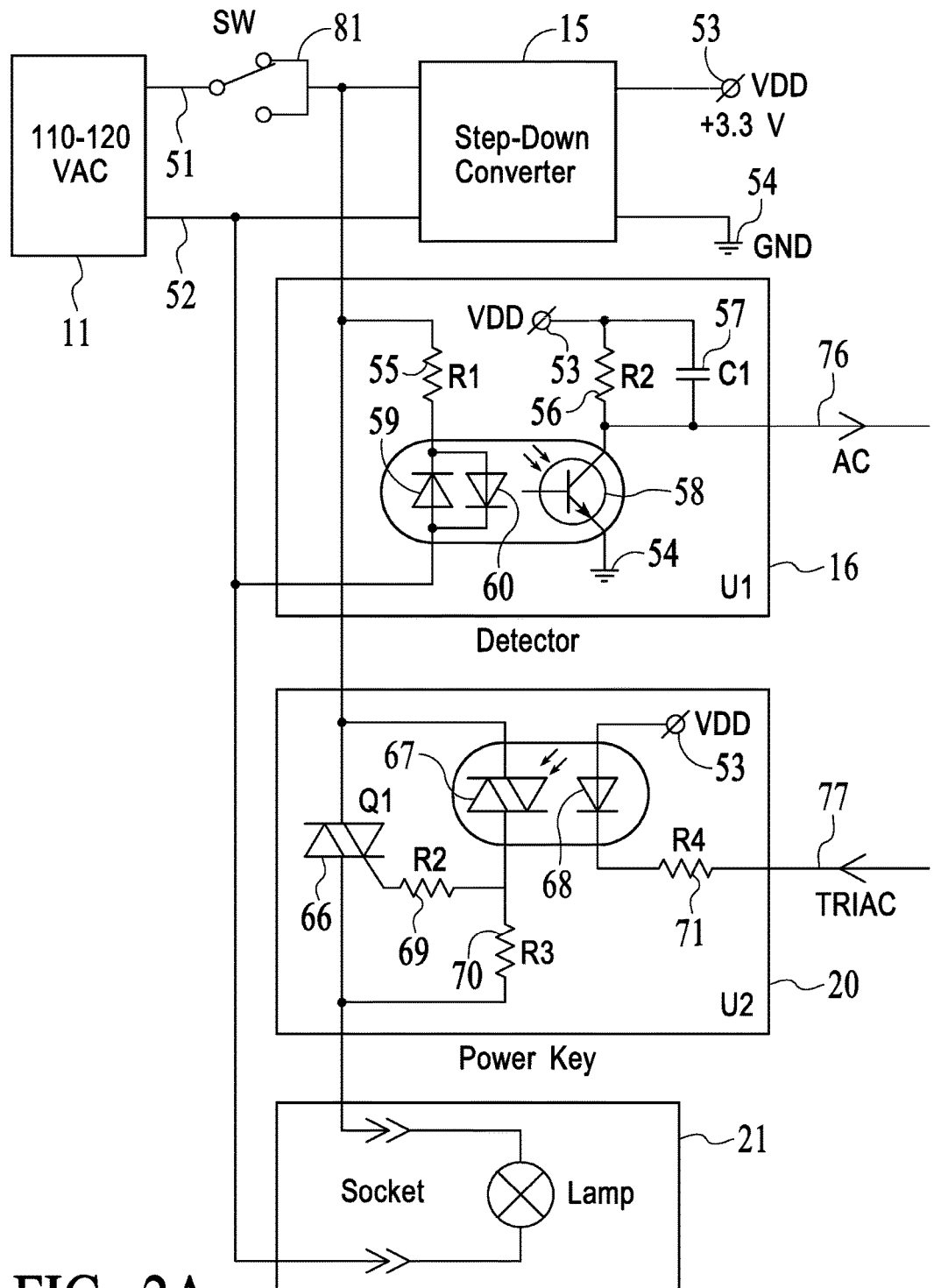
FIG. 2A and FIG. 2B show a simplified circuit diagram of the multiway switching system shown in FIG. 1 in accordance with an embodiment.
Figure 2B:
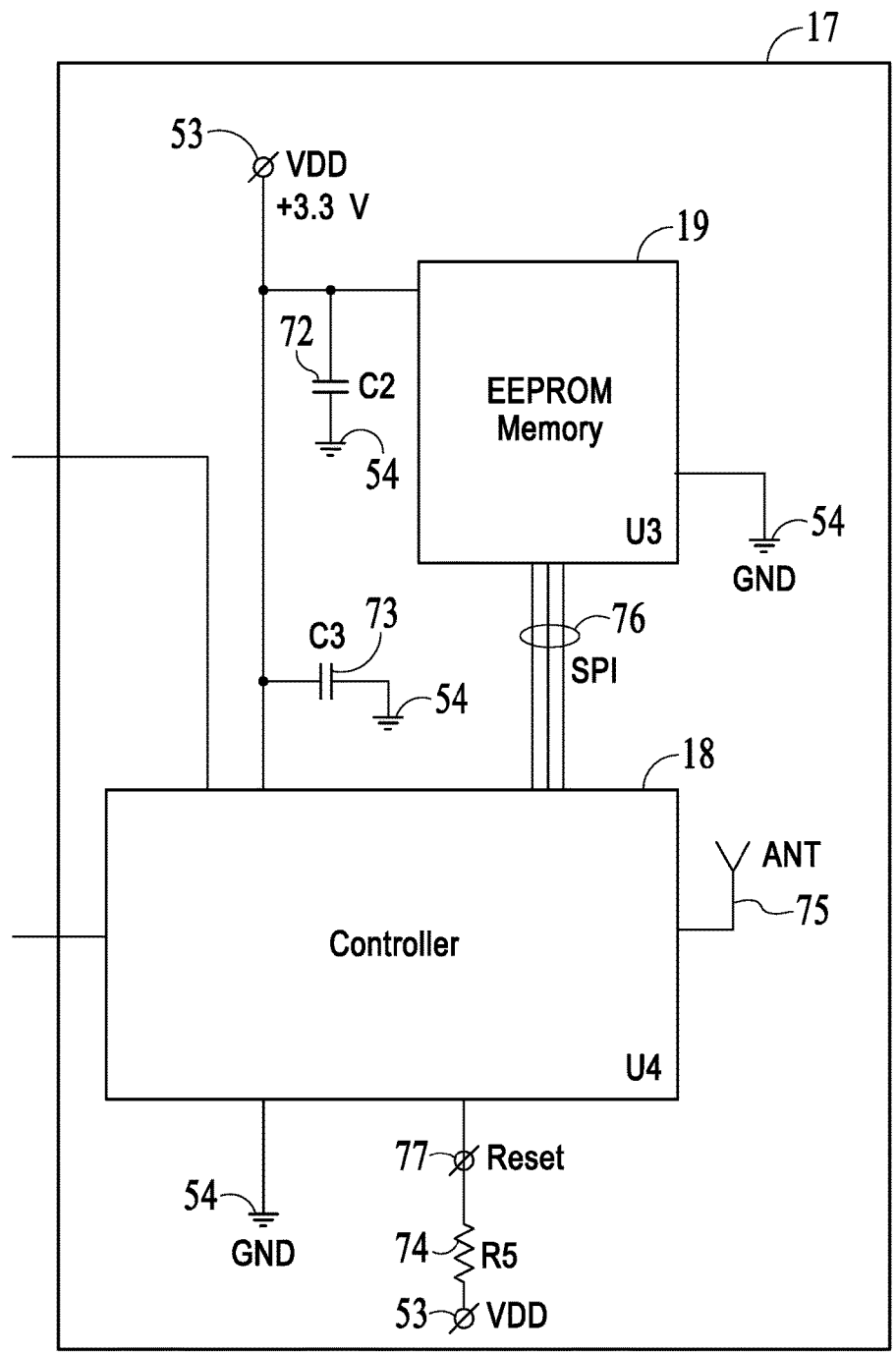

FIG. 2A and FIG. 2B show additional details for one implementation of multiway switching system 10. Main power supply 11 provides approximately 110 volts or 220 volts of alternating current between a lead 51 and a lead 52. In both the first switch position and the second switch position, power from main power supply 11 is connected through switch 14 to multiway switching system 10. However, for the brief time it takes switch 14 to toggle between the first switch position and the second switch position, power through switch 14 is disconnected.

Power supply 15 is shown implemented as a step-down converter that provides 3.5 DC volts between a VDD power 53 and a ground 54. Detector 15 includes a resistor 55, a resistor 56 a capacitor 57 a diode 59 and a diode 60 and a transistor 58, connected as shown to generate a signal on an output 76 that is one voltage level when power through switch 14 is connected, and another voltage level when power through switch 14 is disconnected.

Circuitry 17 is shown to include a capacitor 72, a capacitor 73 and a resistor 75 connected to controller 18 and memory 19. For example, memory 19 is composed of electrically erasable programmable read-only memory (EEPROM). Power key 20 is shown to include a resistor 71, a resistor 70, a resistor 69, a switch 66, a switch 67 and a diode 68 connected as shown. Switch 67 is controlled by current through diode 68. Switch 66 is controlled by current through resistor 69 and resistor 70. Controller 75 places voltage signals on output 77 to control switch 67 and thus to control switch 66 and lamp 21.

Figure 3:
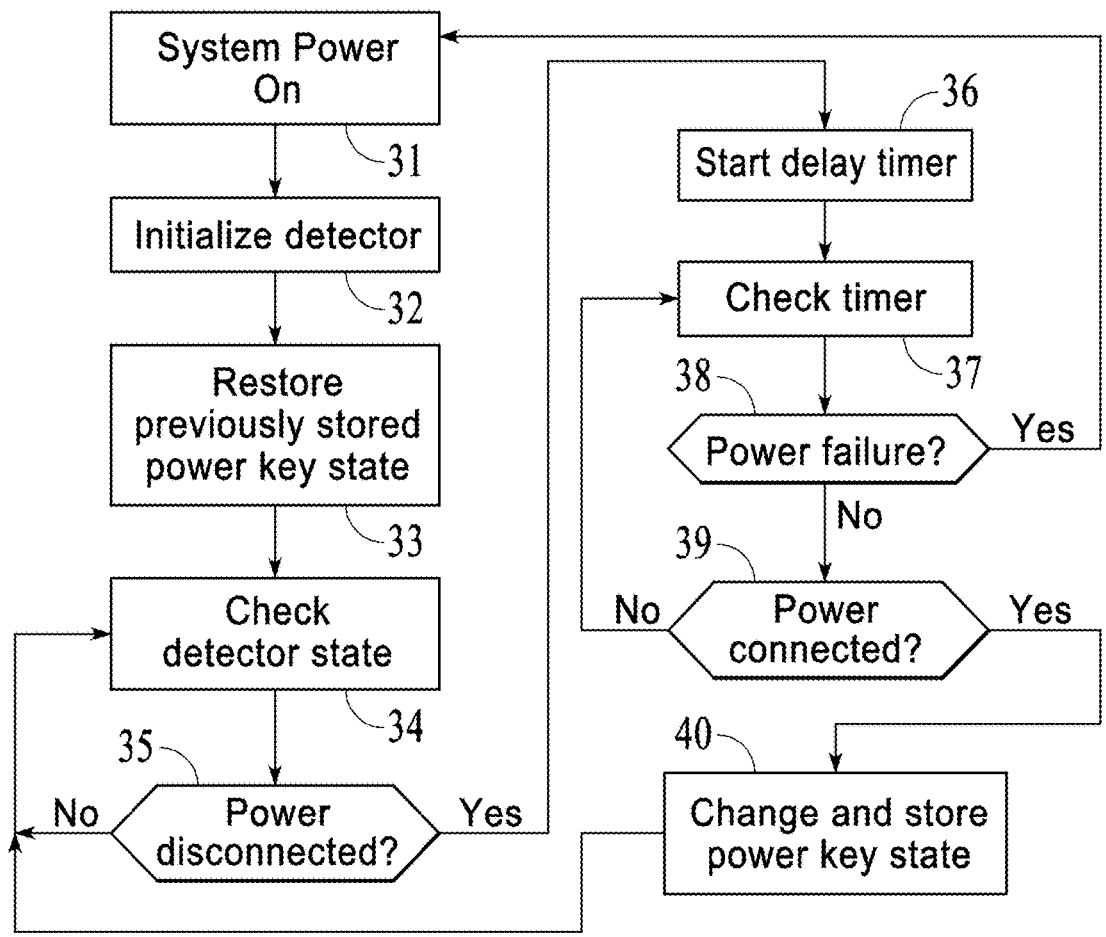
FIG. 3 is logic flow for the multiway switching system shown in FIG. 1 in accordance with an embodiment.

FIG. 3 is a simplified flow chart that shows logic flow of controller 18 running program code stored in memory 19. In a block 31, the system is powered on. In a block 32, controller 18 initializes its interface with detector 16. In a block 33, controller 18 through output 77 restores power key 20 to a previously stored power key state. In a block 34 and a block 35, controller through detector output 76 monitors state of detector 34 to detect a power disconnection indicating a switch toggle.

When state of detector output 76 indicates detector 16 detects a power disconnection, in a block 36 a delay timer is started. In a block 37, the timer is checked. In block 38, a check is made to see whether there is a time-out indicating a power failure caused the power disconnection. A power failure is assumed when the timer reaches a predetermined count without power connection being detected. If there is a power failure, when the power is restored, controller 18 executes system power on in block 31.

Figure 4:
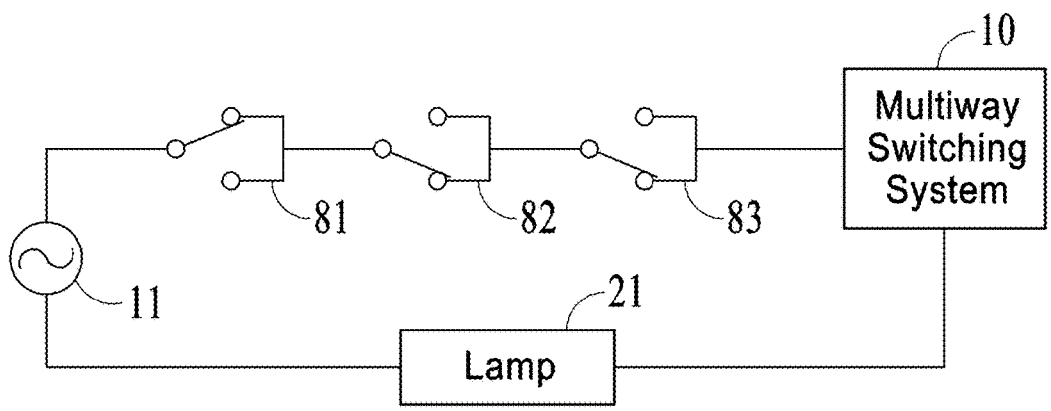
FIG. 4 shows switches connected in series used in a multiway switching system in accordance with an embodiment.

If no power failure is detected, in a block 39, a check is made to see whether power is again connected before timeout has occurred. If power is connected in time, in a block 40, controller 18 toggles the value on output 77 to change the power key state. The current power key state is also stored in memory 19. Controller 18 then returns to block 34 to check detector state. In this way, control circuitry 17 toggles power key 20 from a first state to a second state or from the second state to the first state whenever detector 16 detects power source 11 being electrically disconnected through one or more switches to multiway switching system 10 then being electrically connected through the through one or more switches multiway switching system 10 within a predetermined window of time While FIG. 1 shows a single switch 14 connected to multiway switching system 10, multiway switching system 10 works equally well when any number of switches are connected in series. For example, FIG. 4 shows a switch 81, a switch 82 and a switch 83 connected in series between main power supply 11 and multiway switching system 10.

Whenever any of switches 81, 82 or 83 are toggled, this will be detected by detector 16 within multiway switching system 10 as a brief disconnection as power flow to multiway switching system 10. The toggling of any of switches 81, 82 or 83 will thus result in multiway switching system 10 toggling the state of a lamp 21 (or the state of any electrical device/load connected to multiway switching system 10) from an OFF state to an ON state or from the ON state to the OFF state. In this way, any of switches 81, 82 or 83 can be used to turn ON and turn OFF lamp 21. The serial connection between switches 81, 82 and 83 allows for very straightforward wiring of buildings where any number of switches can control a light system or other load using only the wiring necessary to wire the switches in series.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A lighting system comprising:
   a lamp system;
   a plurality of switches connected in series with a power source that supplies power to the lamp system, the lamp system using power supplied from the power source through the plurality of switches to supply power to the lamp system; and
   a multiway switching system connected between the plurality of switches and the lamp system so that no switch in the plurality of switches is directly connected to the lamp system, the multiway switching system including
      a detector connected to the plurality of switches, the detector detecting when the power source is electrically connected through all the switches in the plurality of switches to the multiway switching system and the detector detecting when the power source is not electrically connected through the plurality of switches to the multiway switching system,
      a power key connected to the lamp system, the power key in a first state providing power through the plurality of switches to the lamp system and in a second state does not provide power to the lamp system, and
      control circuitry connected to the detector and the power key, the control circuitry controlling whether the power key is in the first state or is in the second state, the control circuitry toggling the power key from the first state to the second state or from the second state to the first state whenever the detector detects the power source being electrically disconnected through the plurality of switches to the multiway switching system then being electrically connected through all the switches in the plurality of switches to the multiway switching system within a predetermined window of time;
   wherein the plurality of switches includes a first switch and a second switch, each of which is an electrical equivalent of a single pole double throw switch with both throws being electrically connected together so that current is able to travel through the single pole double throw switch regardless of which throw is connected to the single pole; and
   wherein during transitions between the throws, current is not able to travel through the single pole double throw switch.

2. A lighting system as in claim 1:
   wherein the first switch that has a first switch position and a second switch position;
   wherein in the first switch position the power source is electrically connected through the first switch position to the multiway switching system;
   wherein in the second switch position the power source is electrically connected through the first switch to the multiway switching system; and
   wherein when transitioning between the first switch position and the second switch position the first switch electrically disconnects the power source from the multiway switching system.

3. A lighting system as in claim 1 wherein the power source is an alternating current (AC) power source with one of main of the AC power source connected to the first switch.

4. A lighting system as in claim 1 wherein the multiway switching system additionally includes a power converter that converts a signal from the power source to a direct current (DC) signal that powers the control circuitry.

5. A lighting system as in claim 1 wherein the control circuitry includes a controller and electrically erasable programmable read-only memory (EEPROM).

6. A lighting system as in claim 1 wherein the lamp system comprises a single lamp.

7. A multiway switching system, comprising:
   a plurality of switches, each switch in the plurality of switches being an electrical equivalent of a single pole double throw switch with both throws being electrically connected together so that a power signal from a power source is able to travel through the switch regardless of which throw is connected to the single pole, wherein when transitioning between throws, the switch does not allow the power signal to travel through the switch;
   a detector connected to the plurality of switches, the detector detecting when the power signal is electrically connected to the detector through the plurality of switches and when no power signal is electrically connected through all the switches in the plurality of switches;
   a power key that in a first state provides power through the plurality of switches to an electrical load and in a second state does not provide power to the electrical load, the power key being connected between the plurality of switches and the electrical load so that no switch in the plurality of switches is directly connected to the electrical load; and,
   control circuitry connected to the detector and the power key, the control circuitry controlling whether the power key is in the first state or is in the second state, the control circuitry toggling the power key from the first state to the second state or from the second state to the first state whenever the detector detects the power signal being electrically disconnected through the plurality of switches then being electrically connected through all the switches in the plurality of switches within a predetermined window of time.

8. A multiway switching system as in claim 7 wherein the electrical load is a lighting system.

9. A multiway switching system as in claim 7 wherein the electrical load is a lamp.

10. A multiway switching system as in claim 7 wherein the power source is an alternating current (AC) power source with one main of the AC power source connected to one of the plurality of switches.

11. A multiway switching system as in claim 7 additionally comprising a power converter that converts a signal from the power source to a direct current (DC) signal that powers the control circuitry.

12. A multiway switching system as in claim 7 wherein the control circuitry includes a controller and electrically erasable programmable read-only memory (EEPROM).

13. A multiway switching system as in claim 7 wherein the multiway switching system is integrated as part of a smart light.

14. A method for providing multiway switching, comprising:

providing a plurality of switches connected in series between a power source and a detector so that each switch in the plurality of switches is an electrical equivalent of a single pole double throw switch with both throws being electrically connected together so that current is able to travel through the circuit regardless of which throw is connected to the single pole, wherein when transitioning between throws, the switch does not allow current through the switch;

detecting when any switch in the plurality of switches transitions between throws;

toggling power supplied to an electrical load when any switch in the plurality of switches detects a transition between throws so that when the electrical load is electrically disconnected from the power source, the toggling results in the electrical load being electrically connected through the plurality of switches to the power source and so that when the electrical load is electrically connected through the plurality of switches to the power source, the toggling results in the electrical load being electrically disconnected from the power source, wherein the toggling is performed by a power key connected between the plurality of switches and the electrical load so that no switch in the plurality of switches is directly connected to the electrical load.

15. A method as in claim 14 wherein the power source is an alternating current (AC) power source with one main of the AC power source connected to one of the plurality of switches.

16. A method as in claim 14 wherein the electrical load is a lamp system.

17. A method as in claim 14 wherein the electrical load is a fan.

\* \* \* \* \*